(12) United States Patent
Schneider

(10) Patent No.: US 6,385,936 B1
(45) Date of Patent: May 14, 2002

(54) FLOOR TILE

(75) Inventor: Bernd Schneider, Lage/Billinghausen (DE)

(73) Assignee: HW-Industries GmbH & Co., KG, Dissen (DE)

(*) Notice: Subject to any disclaimer, the term of this patent is extended or adjusted under 35 U.S.C. 154(b) by 0 days.

(21) Appl. No.: 09/694,711

(22) Filed: Oct. 24, 2000

(30) Foreign Application Priority Data

Jun. 29, 2000 (DE) .......................................... 100 31 639

(51) Int. Cl.⁷ ................................................. E04B 2/08
(52) U.S. Cl. ........................ 52/589.1; 52/177; 52/586.1; 52/590.2; 52/592.1; 52/578; 52/592.3; 52/591.3; 403/364; 403/375; 403/381
(58) Field of Search ........................... 52/589.1, 177, 52/586.1, 590.2, 592.1, 578, 592.3, 591.3; 403/364, 375, 381

(56) References Cited

U.S. PATENT DOCUMENTS

| | | | |
|---|---|---|---|
| 4,287,693 A | * 9/1981 | Collette | ......................... 52/177 |
| 5,797,237 A | * 8/1998 | Finkell, Jr. | ................. 52/589.1 |
| 5,950,378 A | * 9/1999 | Council et al. | ................ 52/177 |

FOREIGN PATENT DOCUMENTS

| | | |
|---|---|---|
| DE | 3343601 | 6/1985 |
| DE | 19854475 A1 | * 11/1998 |
| DE | 19854475 | 7/1999 |
| DE | 20002413 | 4/2000 |

* cited by examiner

Primary Examiner—Carl D. Friedman
Assistant Examiner—Chi Q. Nguyen
(74) Attorney, Agent, or Firm—Stevens, Davis, Miller & Mosher, L.L.P

(57) ABSTRACT

A floor tile, in particular a laminate panel, parquet element or such like, with an edge profile on at least two opposite edges in the form of a modified groove and tongue joint, is designed in such a way that there is a tongue 20, 30 and a groove 22, 26 on each of the said two edges. The edge profiles are contrived so that the adjacent tiles can be locked in place in relation to each other in both the vertical and horizontal directions. Tongue 20 on the first tile 10 and groove 22 in the second tile 12 rise upwards from the bottom of the tiles at an angle. Accordingly, the bottom wall of groove 26 in the first tile and the bottom outer surface of tongue 30 on the second tile 12 are also inclined at an angle, while the top surfaces of the groove and tongue are oriented horizontally or parallel to the plane of the tile.

15 Claims, 3 Drawing Sheets

FLOOR TILE

BACKGROUND OF THE INVENTION

1. Field of the Invention

The invention relates to a floor tile, in particular a laminate panel, parquet element veneer floor element, ready-to-lay parquet element or such like, with an edge profile on at least two opposite edges in the form of a modified groove and tongue joint for the purpose of connecting adjacent tiles, with a simultaneous arrangement consisting of a set of one groove and one tongue on each of at least two edges of which the tongue on one edge of a first tile and the groove in an associated edge of a second tile rise obliquely upwards from the bottom of the tile.

2. Description of the Related Art

A floor tile of this type is disclosed in DE 33 43 604 C2. In this prior art tile, the act of connecting two identical tiles results in a "modified" groove and tongue joint in that adjacent tiles are held in position by the joint relative to each other in both the vertical and horizontal directions, i.e. they cannot become unintentionally separated. Although this horizontal fixation can also be achieved by glueing together adjacent tiles provided with a simple groove and tongue joint, the glueing process demands a lot more work when laying the flooring, and joints of this kind are often not sufficiently long-lasting.

In practice, there is therefore a preference for the type of edge profiles that guarantee an interlocking connection between adjacent tiles in the horizontal direction as well as the vertical.

Interlocking joints of this type are disclosed in the above-mentioned publication as well as in GB 2 256 023 A, WO 98/58142, U.S. Pat. No. 4,426,820, DE-OS 2 238 660, DE 79 28 703 U1 and DE 198 54 475 A1.

SUMMARY OF THE INVENTION

In the process of laying the floor tiles described here, the edge profile of each consecutive tile is generally held at an angle and pushed or slotted into the edge profile of a tile that has already been laid, and then lowered into a horizontal position. This ensures that both edge profiles lock into each other. A floor surface that has been laid in this way is removed by executing the steps in reverse order. This type of assembly or disassembly method is only possible, however, if there is sufficient space above the flooring for the tiles to be positioned at an angle. This is not always the case, e.g. under heating elements, pipes, chimney, seats and other fixed installations.

This invention is therefore based on the task of providing a floor tile of the above-mentioned type with a modified groove and tongue joint as defined above which will lock into place in the horizontal direction as well, but which can be laid not only by angling and lowering consecutive tiles during the assembly process, but also by pushing tiles together horizontally to create a snap-lock effect.

In the case of a floor tile of the type mentioned above, this task is solved in that the groove in the first tile is disposed directly above its tongue, in that the lower wall of this groove falls off towards the back end of the groove by the same amount as the tongue on the first tile rises upwards, in that the upper wall of the groove in the first tile runs essentially parallel to the plane of the tile, and in that the tongue on the second tile matches the shape of the groove in the first tile by having a top surface that runs essentially parallel to the plane of the tile and a bottom surface that falls off towards the end of the tongue.

Whilst an edge joint of this type offers sufficient locking in the horizontal direction against unintentional separation of adjacent tiles, it also has relatively flat, less acutely angled undercuts allowing adjacent tiles to be pushed together or taken apart horizontally, at least when a certain amount of force is applied. Under conditions of normal use, however, the snap effect is sufficient to hold the tiles in position adjacent to each other.

With regard to the terminology used here, it should be noted that comments are always made with reference to the tiles in the position in which they are shown in the drawings, which will be explained below. The terms "top" and "bottom" in particular are to be understood in this sense. It is also evident, however, that the arrangement could equally well be reversed, i.e. that the positions "top" and "bottom" can be interchanged without leaving the scope of the invention.

Floor tiles of the above-mentioned type are generally made from timber materials, in particular medium or high thickness fibreboard, but also from solid wood. Support tiles made from synthetically produced materials or recycled materials such as e.g. polyurethane recycling materials could also be used. The applicability of this invention is not limited with regard to the type of tile material that is used.

The extent of the undercut resulting from the interaction of the tongue on the first tile and the groove in the second tile will also depend in each case on the elasticity of the material. The undercut can be defined by selecting the inclination and the length of the tongue on the first tile. As a general rule, an angle of 15° is appropriate.

To facilitate the joining process, the edges at the front end of the tongues and the edges at the entrance to the grooves should preferably be tapered.

The tongue on the second tile is preferably disposed directly above its groove. The tongue on the second tile therefore forms the top limit of the groove in the second tile. The bottom surface of the tongue on the second tile is therefore inclined by the same degree as the tongue on the first tile. Whilst the tongue on the first tile has two essentially parallel top and bottom surfaces inclined upwards at an angle of e.g. 15°, the lower surface of the tongue on the second tile is inclined downwards towards the free end, as already mentioned, whilst the upper surface is essentially horizontal, i.e. parallel to the tile plane of the tiles to be joined. It is preferable to ensure that the projecting edges on the top and bottom sides of the tongue on the second tile are also tapered. The bottom edge simultaneously forms the top edge of the groove in the second tile.

In the event that the locking effect of the above-mentioned edge joint is insufficient, provision can be made for an additional locking rib which engages with a locking groove in the other tile. The locking rib can be disposed either on the top or bottom surface of one of the tongues, or, alternatively, on the top or bottom wall of one of the grooves. The locking rib is preferably disposed on the top surface of the tongue on the second tile and the matching locking groove is disposed in the top wall of the groove in the first tile. Basically, however, it is of no importance on which of the tongues the locking rib or locking groove takes effect, or whether this happens on the top or bottom side of the tongue.

If this additional locking means is used, the two tongues could be made shorter, or could be angled to a lesser degree.

The vertical cross-section of the locking rib and locking groove is preferably contrived as a trapezoidal or rounded trapezoidal shape which therefore has sides that slope to a greater or lesser degree. Steep or even vertical sides result in greater rigidity, but render the assembly or disassembly process more difficult.

Other features and advantages of the invention derive from the sub-claims. Preferred embodiments of the invention will be explained in more detail below with reference to the enclosed drawings, in which:

DETAILED DESCRIPTION OF THE PREFERRED EMBODIMENTS

Figure 1:
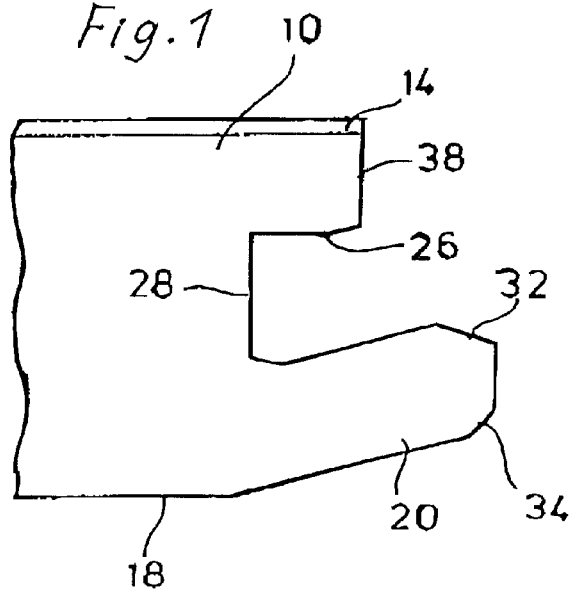
FIG. 1 shows a schematic section of the adjacent edges of two tiles to be joined.

FIG. 1 shows the edges of two floor tiles to be joined, of which the left-hand one will be referred to below as the first tile, 10, and the right-hand one as the second tile, 12. Tiles 10, 12 may be made from a laminate, from a timber material and/or plastic, or from solid wood. A top covering layer 14, 16 is shown here by way of example. The first tile 10 shown on the left of FIG. 1 has a tongue 20 that rises up from the bottom surface 18 of the first tile and engages with a groove 22 in the second tile 12, said groove rising upwards towards the inside of groove 22, i.e. towards the back end 24 of the groove by the same amount as tongue 20 rises upwards.

Disposed in the first tile above the obliquely rising tongue 20, there is a groove 26 whose bottom wall, which is formed by the top surface of tongue 20, falls away towards the back end 28 of the groove. In contrast, the top wall of groove 26 runs essentially horizontally, i.e. parallel to the tile plane of the two tiles 10, 12.

The top of groove 22 in the second tile 12 is defined by a wall that rises upwards at an angle towards the back end 24 of the groove, forming the bottom surface of a tongue 30 on the second tile 12. This tongue 30 also has a top surface that runs essentially horizontally, parallel to the plane of the tile, to match the cross-section of groove 26 in the first tile.

The top and bottom edges of the end of tongue 20 on the first tile 10 are each contrived with a taper 32, 34 to facilitate the insertion into groove 22. The top edge of this groove 22 also has a taper 36, which simultaneously forms the bottom edge of tongue 30.

Above groove 26 in the first tile 10 and tongue 30 on the second tile 12, there are vertical front faces 38, 40 which come into contact with each other when the tiles are laid, thereby defining the position of the tiles. Groove 22 in the second tile 12 is downwardly limited by a lip 42 whose top surface is formed by the wall of groove 22, and which is in turn downwardly limited by the bottom surface 44 of the second tile 12.

Figure 2:
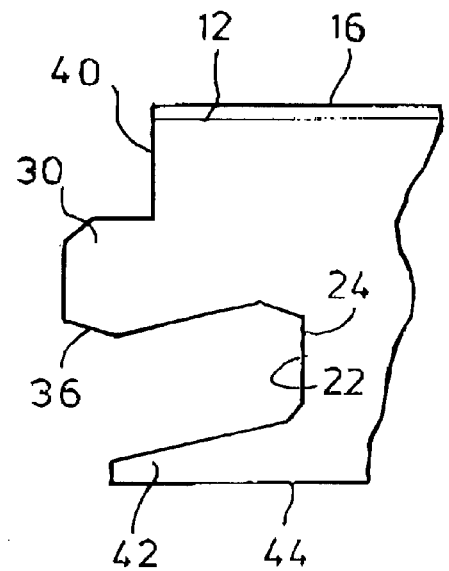
FIG. 2 is a corresponding representation of a first step in the process of joining up the tiles.
Figure 2:
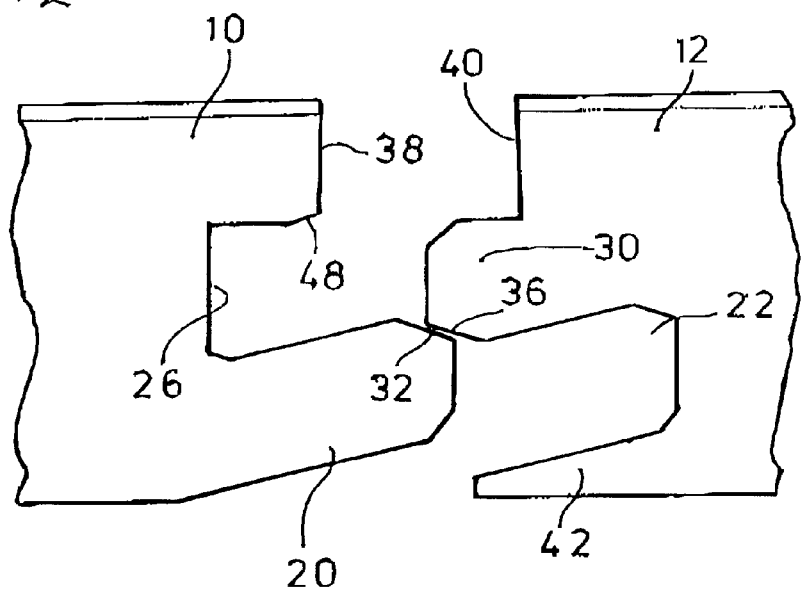
Figure 3:
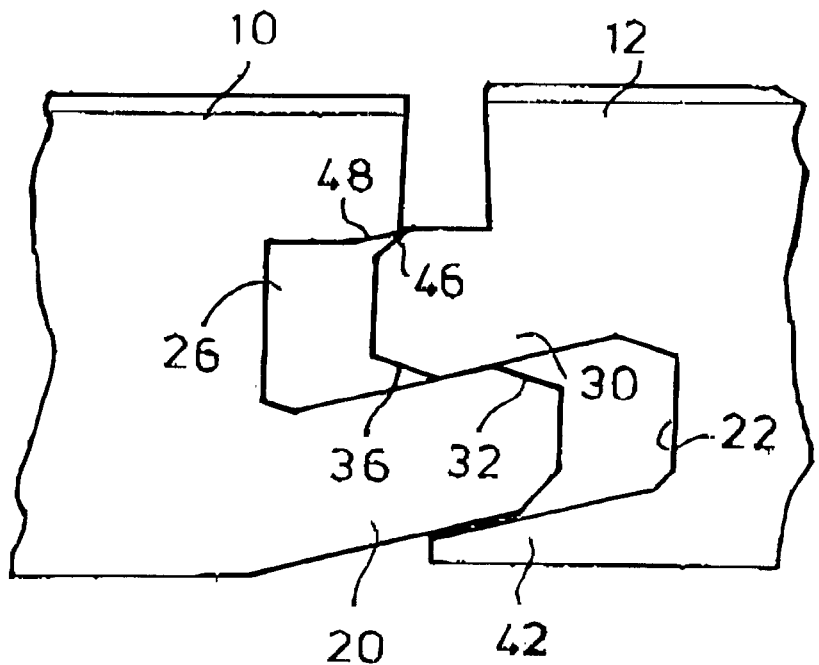
FIG. 3 shows a further step in the process of joining up the tiles.
Figure 4:
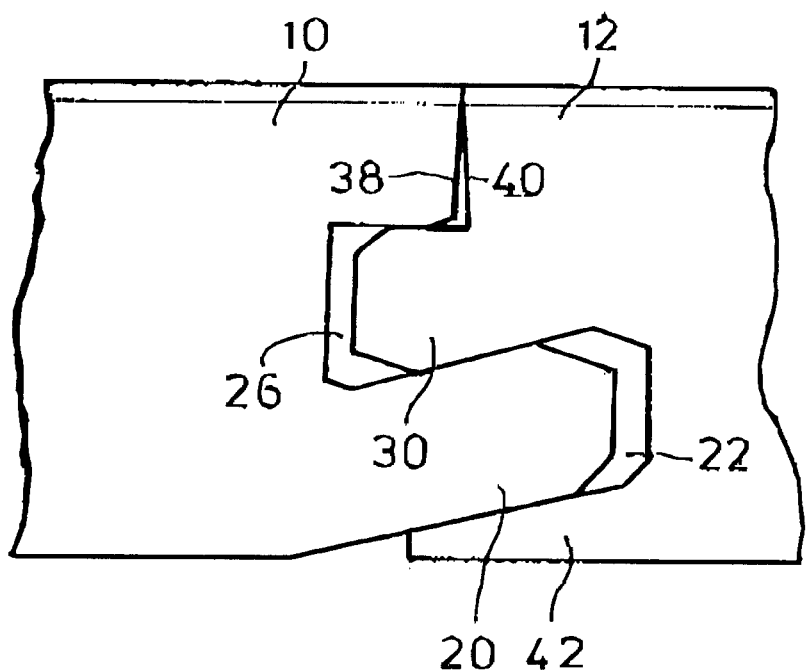
FIG. 4 is a corresponding representation showing the tiles in their joined-up end position.

FIGS. 2 to 4 show three consecutive steps in the process of laying the floor tiles according to both the invention and the first embodiment shown in FIG. 1.

As shown in FIG. 2, taper 32 on the top edge of tongue 20 and taper 36 on the bottom edge of tongue 30 on the second tile 12, which simultaneously forms the top edge of groove 22, first come into contact with each other. Provided the material is sufficiently flexible, tongue 20 on the first tile 10 is bent slightly downwards in the process, whilst tongue 30 on the second tile is bent slightly upwards. If the material of tiles 10, 12 is less flexible, the second tile 12 is raised very slightly upwards, as shown in FIG. 3.

In this case, the upper edge of tongue 30 on the second tile 12, which is provided with a taper 46, abuts against the top edge of groove 26, which is also provided with a taper 48.

Despite the interacting tapers 46, 48, when the two tiles are pushed together the slight over-dimensioning of tongue 30 in relation to the recess of groove 26 has to be overcome by elastic deformation in order for the tiles to finish up in the position shown in FIG. 4. In the position shown in FIG. 4, the end position of the two tiles 10, 12 is determined by the top portion of the two front faces 38, 40. Tongues 20, 30 do not, however, come into contact with the respective back ends 24, 28 of the grooves, thereby reliably eliminating the possibility of an open gap forming on the top surface of tiles 10, 12.

Figure 5:
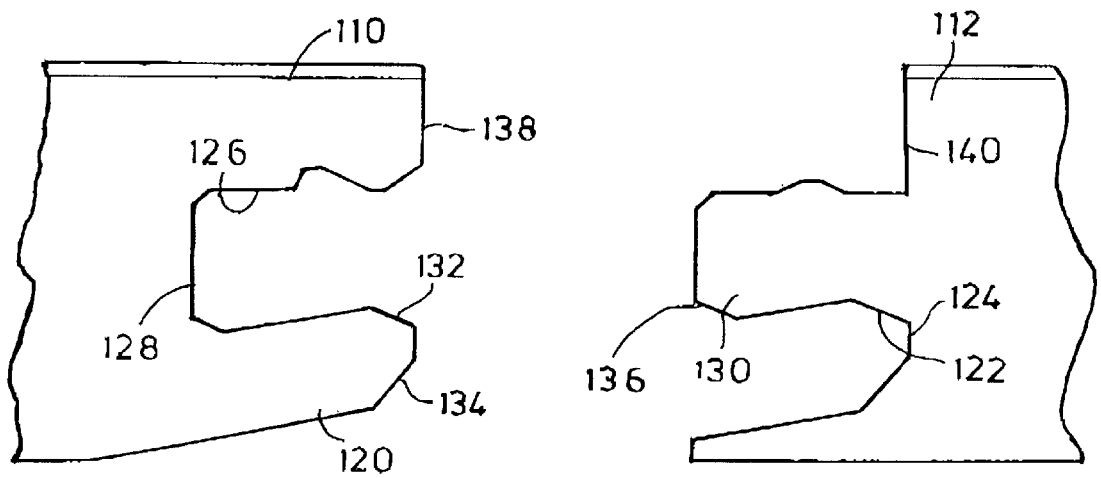
FIG. 5 corresponds to FIG. 1, but shows another embodiment of the floor tiles.
Figure 6:
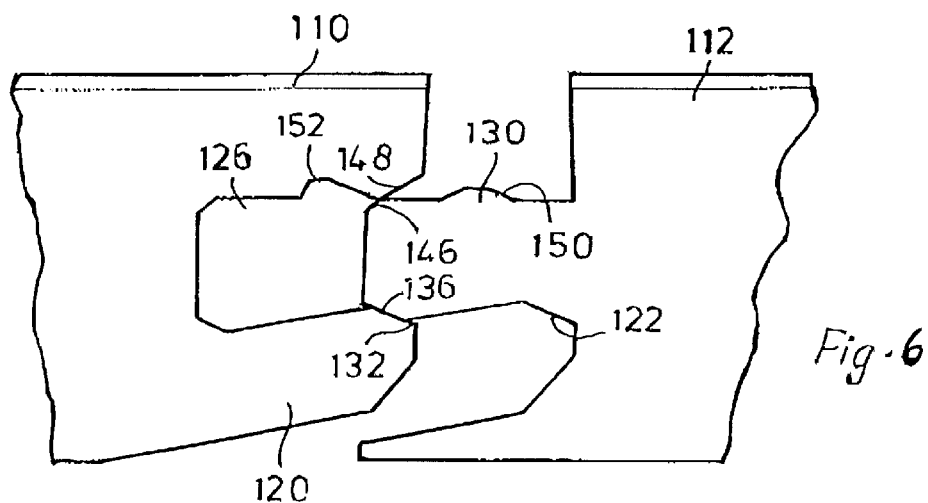
FIG. 6 shows the first step in joining together the two tile edges.
Figure 7:
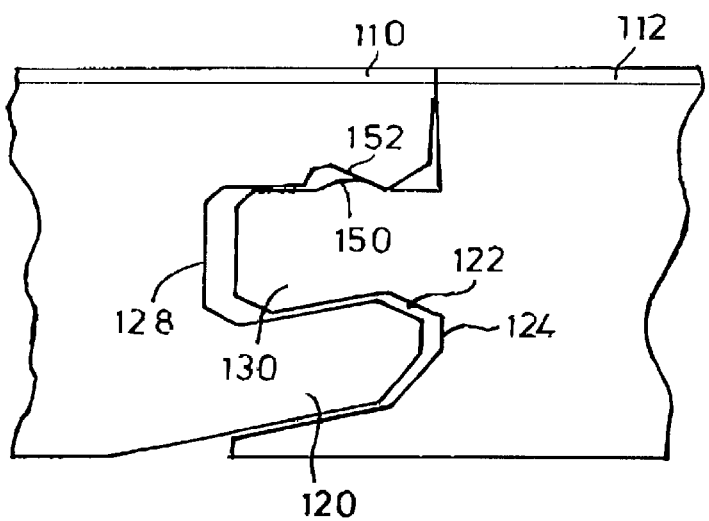
FIG. 7 is a section showing the position of the joined-up tiles.

FIGS. 5 to 7 show another embodiment of the invention which basically coincides to a large degree with the first embodiment, but nevertheless differs in one or two significant ways. To allow a direct comparison between the two embodiments, the same reference numbers increased by 100 will be used for the second embodiment. One of the main differences with respect to the first embodiment is that the tongue 120 on the first tile 110 is considerably shorter than in the first embodiment whilst on the other hand, the tongue 130 on the second tile 12 is longer. The tongue 120 on the first tile essentially ends in the same plane as the top front face 138 of the first tile 110.

Otherwise, however, in the second embodiment the tongue 120 on the first tile is also inclined upwards, e.g. at an angle of 15°, and the groove 122 in the second tile 112 runs obliquely upwards at the same angle towards the back end 124 of the groove. As a result, the bottom edge of groove 126 in the first tile 110 also falls away towards the back end 128 of the groove, whilst the associated tongue 130 on the second tile 112 runs obliquely downwards towards its free end, i.e. towards the left in FIG. 5.

In the second embodiment tapers are also contrived on the outer edges of tongues 120, 130 and on the edges of grooves 126, 122.

When the two tiles 110, 112 are pushed together, tapers 146 and 148 on the top edge of tongue 130 and the top edge of groove 126 abut against each other so that the elements involved necessarily undergo a certain deformation. Just afterwards in the process of pushing the tiles together, tapers 132 and 136 on the top edge of tongue 120 and the bottom edge of tongue 130 abut against each other as can be seen in FIG. 6.

Another particularity of the second embodiment is that on the top surface of tongue 130 on the second tile 112, there is locking rib 150 running in the longitudinal direction of tongue 130, which matches with a locking groove 152 in the top wall of groove 126 in the first tile 110. Locking rib 150 has a flattened or rounded trapezoidal shaped cross-section, i.e. has slightly rising flanks on both sides to facilitate insertion into groove 126 and, in the event of the tiles being separated, removal from locking, groove 152.

In the end position shown in FIG. 7, the top portion of front faces 138 and 140 once again determines the end position. The locking effect is guaranteed by both the interaction of locking rib 150 with locking groove 152, and by the interacting sloping surfaces of the tongue 120 on the first tile 110 and the tongue 130 on the second tile 112.

What is claimed is:

1. A floor tile with an edge profile on at least two opposite edges in a form of a modified groove and tongue joint to facilitate connecting of adjacent tiles, with a simultaneous arrangement consisting of a set of one groove and one tongue on each of at least two edges, of which the tongue on one edge of a first tile and the groove in an associated edge of a second tile rise obliquely upwards from a bottom of the tile, characterized in that the groove in the first tile is disposed directly above its tongue, and in that a bottom wall of this groove falls away towards a back end of the groove at the same angle as the tongue on the first tile rises, in that the top wall of the groove in the first tile runs essentially parallel to a plane of the tile, and in that the tongue on the second tile has a top surface that runs essentially parallel to the plane of the tile to match a shape of the groove in the first tile, and a bottom surface which falls away towards the end of tongue.

2. The floor tile of claim 1, wherein the tongue on the second tile is disposed directly above its groove.

3. The floor tile of claim 1, wherein the assembled position between two adjacent tiles is determined by essentially vertical front faces disposed on both tiles above tongue on the second tile and groove in the first tile.

4. The floor tile of claim 1, wherein the tapers are contrived on the top and bottom edges of the tongues on the tiles.

5. The floor tiles of claim 1, wherein the tapers are contrived on the top and bottom edges of the grooves.

6. The floor tile of claim 1, wherein the tongue on the first tile and groove in the second tile are inclined upwardly at about 15°.

7. The floor tile of claim 1, wherein the tongue on the first tile projects beyond the front face of the first tile.

8. The floor tile of claim 1, wherein the tongue on the first tile ends essentially in the plane of the front face of the first tile, and in that the back end of groove in the second tile lies essentially in the plane of the front face of the second tile.

9. The floor tile of claim 1, wherein on one side of one of the tongues there is a locking groove or projecting locking rib running in the longitudinal direction of the tongue, and in that a matching locking rib or locking groove is contrived in a matching position in the inside wall of the associated groove in the adjacent tile.

10. The floor tile of claim 9, wherein contrived on the top side of tongue on the second tile there is a projecting locking rib running in the longitudinal direction of the tongue, and in that a matching locking groove is contrived in the top inside surface of the groove in the first tile.

11. The floor tile of claim 9, wherein the locking rib has a trapezoidal or rounded trapezoidal vertical cross-section with sloping flanks on both sides.

12. The floor tile of claim 9, wherein the locking groove has a trapezoidal to rounded trapezoidal vertical cross-section with sloping flanks on both sides.

13. The floor tile of claim 12, wherein the flank of locking groove is steeper on the side closest to the back end of the groove than the flank closest to the outside.

14. The floor tile of claim 1, in which the floor tile is one selected from the group consisting of a laminated panel, parquet element and ready-to-lay parquet element.

15. The floor tile of claim 1, which is one selected from the group consisting of a laminated panel and a parquet element.

* * * * *